US010772460B2

(12) United States Patent
Accursi (10) Patent No.: US 10,772,460 B2
(45) Date of Patent: Sep. 15, 2020

(54) APPARATUS FOR MAKING BEVERAGES USING CAPSULES CONTAINING A FOOD SUBSTANCE

(71) Applicant: CAFFITALY SYSTEM S.P.A., Gaggio Montano (BO) (IT)

(72) Inventor: Giovanni Accursi, Porretta Terme (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 127 days.

(21) Appl. No.: 16/068,833

(22) PCT Filed: Jan. 26, 2017

(86) PCT No.: PCT/IB2017/050411
§ 371 (c)(1),
(2) Date: Jul. 9, 2018

(87) PCT Pub. No.: WO2017/134544
PCT Pub. Date: Aug. 10, 2017

(65) Prior Publication Data
US 2019/0021543 A1  Jan. 24, 2019

(30) Foreign Application Priority Data
Feb. 2, 2016  (IT) .......................... 102016000010585

(51) Int. Cl.
*A47J 31/44* (2006.01)
*A47J 31/52* (2006.01)
(Continued)

(52) U.S. Cl.
CPC ........... *A47J 31/4492* (2013.01); *A23F 5/262* (2013.01); *A47J 31/3623* (2013.01); *A47J 31/407* (2013.01); *A47J 31/52* (2013.01)

(58) Field of Classification Search
CPC ...... A47J 31/4492; A47J 31/52; A47J 31/407; A47J 31/3623; A23F 5/262
See application file for complete search history.

(56) References Cited

U.S. PATENT DOCUMENTS 7,703,380 B2   4/2010  Ryser et al.
8,425,963 B2   4/2013  Ryser et al.
(Continued)

FOREIGN PATENT DOCUMENTS

EP       1721553 A1   11/2006
EP       1757212 A2    2/2007
(Continued)

*Primary Examiner* — Anthony J Weier
(74) *Attorney, Agent, or Firm* — Pearne & Gordon LLP (57) ABSTRACT

An apparatus for making beverages using capsules (2) containing a food substance, including an extraction unit (3) in which an openable extraction chamber (4) is made, an infeed section (9) for a capsule (2), a feed path (10) for the capsule (2) in the apparatus (1) from the infeed section (9), and at least one image acquisition device (12) operating in the range of visible light, positioned along the feed path (10) outside the extraction chamber (4), and designed, in use, when the capsule (2) is positioned in an image capture zone (13) located along the feed path (10), to capture images of at least an identification portion (14) of the capsule (2) on which a graphical element (15) is present and visible; the image acquisition device (12); an electronic processing unit (20) is connected to the image acquisition device (12) and is programmed to selectively enable or not enable the making of a beverage by performing the following operating steps based on a comparison between a first image detected by the image acquisition device (12) and one or more reference images saved in the apparatus (1).

23 Claims, 5 Drawing Sheets

(51) Int. Cl.
A47J 31/36 (2006.01)
A47J 31/40 (2006.01)
A23F 5/26 (2006.01)

(56) References Cited

U.S. PATENT DOCUMENTS

| | | |
|---|---|---|
| 8,613,246 B2 | 12/2013 | Ryser et al. |
| 9,392,901 B2 | 7/2016 | Ryser et al. |
| 2006/0230941 A1 | 10/2006 | Ryser et al. |
| 2010/0071563 A1 | 3/2010 | Ryser et al. |
| 2010/0173053 A1 | 7/2010 | Ryser et al. |
| 2014/0069281 A1 | 3/2014 | Ryser et al. |
| 2015/0297023 A1 | 10/2015 | Hansen et al. |
| 2016/0157668 A1 | 6/2016 | Bugnano et al. |
| 2016/0174752 A1 | 6/2016 | Casiddu |

FOREIGN PATENT DOCUMENTS

| | | |
|---|---|---|
| EP | 2168073 B1 | 3/2010 |
| EP | 2627228 B1 | 8/2013 |
| GB | 2509081 A | 6/2014 |
| WO | 2015004551 A1 | 1/2015 |
| WO | 2015019248 A1 | 2/2015 |
| WO | 2015019249 A1 | 2/2015 |

APPARATUS FOR MAKING BEVERAGES USING CAPSULES CONTAINING A FOOD SUBSTANCE

This invention relates to an apparatus for making beverages using capsules containing a food substance that, in the context of this invention, may be of any type (soluble or insoluble, powdered, granules, liquid, etc.).

There are currently many types of prior art apparatuses capable of making beverages, which, in general, comprise an extraction unit in which an extraction chamber is made in which, in use, a capsule can be inserted. The extraction unit in turn comprises a first part and a second part, which are movable, at least one relative to the other, between a home position in which they are at a distance from one another and in which the extraction chamber is open to allow the positioning of a capsule in it, and an extraction position in which they are coupled together and close the extraction chamber. Depending on requirements, the movement of the first part and of the second part relative to each other may be achieved manually or may be motor-driven, as well as after specific user commands or automatically.

There are means for making a beverage for, in use, making water (hot and pressurised or neither) circulate through the capsule contained in the closed extraction chamber, thereby causing the beverage to be formed, and for supplying the beverage to the outside of the apparatus.

There are also prior art apparatuses in which one of either the first part or the second part is fixed and the other may be removed for loading the capsule in it, then refitted on the apparatus for making the beverage, and other apparatuses in which both the first part and the second part always remain fixed to the rest of the apparatus and can only be moved towards and away from each other along various more or less complex lines. This latter type also includes the family of apparatuses, such as those known as having a horizontal unit (that is to say, those in which the movement of the first part and the second part towards and away from each other occurs following a movement along a horizontal axis), which also comprise retaining means for retaining the capsule, designed to support a new capsule to be used in an intermediate position between the first part and the second part, when these parts are in the home position. Such apparatuses have an infeed section at which, in use, a capsule can be fed to the apparatus, and from which a feed path for the capsule extends to the retaining means and along which, usually, the capsule advances by sliding due to gravity.

In the sector of apparatus for making beverages, there are also many prior art apparatuses able to identify the type of capsule fed to the apparatus and, based on this, to determine how to supply the beverage.

According to a first technology used for that purpose, the capsule is equipped with an electromagnetic identification element (such as an RFID element) and the capsule comprises a corresponding reader. Although that solution allows good results in operating terms, it is expensive due to the need to use a disposable identification element on each capsule.

In contrast, a second technology currently used involves optical recognition of the capsule by means of a reading device placed at the extraction chamber and designed to read a bar code or a QR code located on the capsule. However, this latter solution also has disadvantages. In particular, recognition reliability may be reduced as time passes due to the fact that the extraction chamber is a dirty place in which under normal conditions the beverage at least partly circulates, which may leave residues on the walls and in particular on the optical recognition device, and in which there may also be accidental dispersions of the food substance present in the capsules which may in turn cake over the walls. Furthermore, from a commercial viewpoint, the need to reproduce a bar code or a QR code on the capsule negatively impacts the appeal that the look of the capsule may have for the buyer.

The apparatuses able to automatically identify the type of capsule inserted and to select, based on that, the methods for supplying the beverage, are relatively expensive machines that are not within the reach of all consumers.

Not least, in particular with beverages such as coffee, it is well-known that every consumer has his or her own tastes and may prefer that a certain type of capsule be supplied using methods different to those provided in automatic machines.

Moreover, in the simplest apparatuses in which the user controls all operations, there are ever increasing cases of damage to the apparatuses due to either use of capsules that are declared to be compatible with the apparatus, but which have never been approved by the apparatus manufacturer, since they are made with poor quality standards, or due to use of the wrong capsules. Use of the wrong capsules may come about in particular in two ways: either because in a certain system capsules from other systems are erroneously used (many capsules on the market are very similar on the outside), or because for a certain type of supply selected in the machine (e.g.: espresso coffee supplied at high pressure, or filter coffee supplied at low pressure) a capsule not designed for that use is inserted by mistake (for example, respectively a capsule for filter coffee or a capsule for espresso coffee).

Consequently, as well as in the most complex machines, in the simplest apparatuses too, a control system is needed, that can prevent the use in the apparatus of capsules that are not approved by the manufacturer or that are the wrong capsules. The system must also be simple, inexpensive and reliable.

In this context, the technical purpose which forms the basis of this invention is to provide an apparatus for making beverages using capsules containing a food substance which overcomes the above-mentioned disadvantages.

In particular, the technical purpose of this invention is to provide an apparatus for making beverages using capsules containing a food substance, that can operate and supply the beverage only if a capsule that is correct and/or approved by the apparatus manufacturer is used, and that at the same time is equipped with a simple and reliable control system.

The technical purpose and the aims indicated are substantially fulfilled by an apparatus for making beverages using capsules containing a food substance in accordance with what is described in the appended claims.

Further features and the advantages of this invention are more apparent in the detailed description, with reference to the accompanying drawings which illustrate several preferred, non-limiting embodiments of an apparatus for making beverages using capsules containing a food substance, in which.

With reference to the above-mentioned figures, the numeral 1 denotes in its entirety an apparatus for making beverages using capsules 2 containing a food substance, made according to this invention. It should be noticed that in the appended drawings the apparatus 1 is only schematically illustrated. In particular, some details are shown exclusively with reference to parts linked to the innovative aspects of this invention, whilst all details relative to known aspects have been deliberately omitted.

The apparatus 1 comprises first an extraction unit 3 in which an extraction chamber 4 is made in which, in use, a capsule 2 can be inserted, to be used for making the beverage. In particular, this invention can advantageously be used with capsules 2 comprising a cup-shaped main body 5 and a lid 6 fixed to the upper edge of the main body 5.

Associated with the extraction chamber 4 there are means for making a beverage, not illustrated in the accompanying drawings, since they are of the known type and are not linked to the innovative aspects of this invention, designed, in use, for making water that may or may not be hot circulate through a capsule 2 contained in the closed extraction chamber 4, thereby causing the beverage to be formed, and for supplying the beverage formed in that way to the outside of the apparatus 1. In the known way, the means for making the beverage comprise both a water feeding circuit for feeding water, that may or may not be pressurised, to the extraction chamber 4, and a supplying duct for supplying the beverage made to the outside. If necessary, they may also comprise first piercing means for making a first hole in the capsule 2 through which to feed the water into the capsule 2, and second piercing means for making a second hole through which to allow the beverage to come out of the capsule 2. In any case, since the means for making the beverage are not part of the innovative aspects of this invention and are in themselves similar to the prior art ones, they will not be described in further detail herein.

Figure 6:
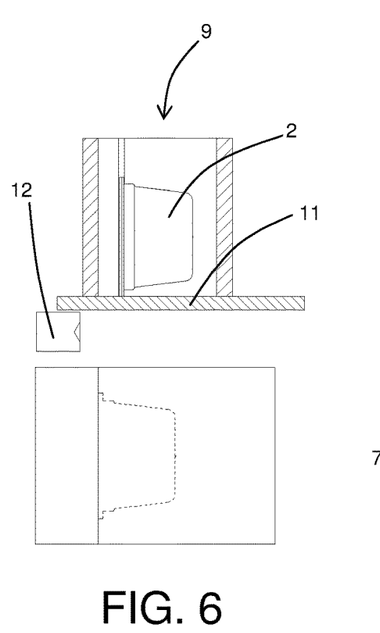
FIGS. 6 and 7 are schematic side views with some parts in cross-section of a third embodiment of an apparatus for making beverages in accordance with this invention, in two different situations.
Figure 7:
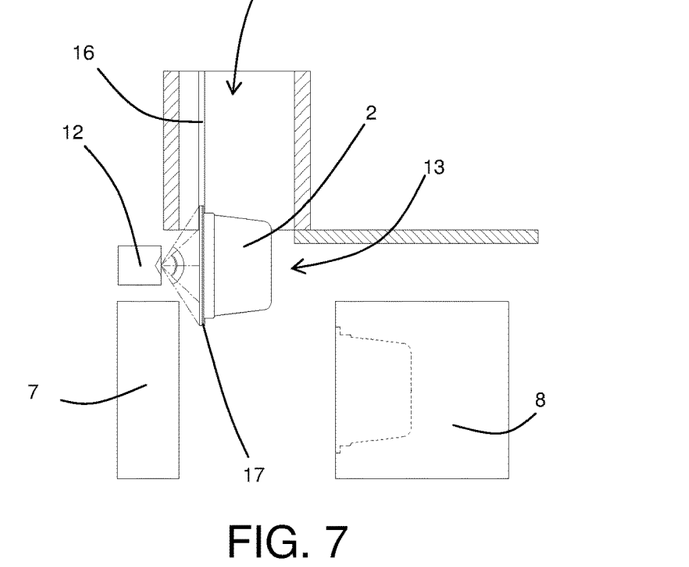

The extraction unit 3 in turn comprises a first part 7 and a second part 8, which are movable, at least one relative to the other, between a home position in which the extraction chamber 4 is open, and an extraction position in which the extraction chamber 4 is closed. When they are in the home position, the first part 7 and the second part 8 of the extraction unit 3 are far enough apart to allow a capsule 2 to be inserted in the extraction chamber 4, whilst, when they are in the extraction position, they are coupled together (FIGS. 1 and 6) so that in use they clamp a capsule 2 in the extraction chamber 4.

In the accompanying FIGS. 1 to 7, the extraction unit 3 is of the horizontal type. Therefore, the first part 7 and the second part 8 are movable one relative to the other with a horizontal line of movement parallel to a central axis defined by the extraction chamber 4. Moreover, the extraction chamber 4 is advantageously made substantially entirely in one of either the first part 7 or the second part 8 (it is in the second part 8 in the accompanying figures), whilst the other part (the first part 7 in the accompanying figures) acts only as a shutting element for the extraction chamber 4.

When the first part 7 and the second part 8 are in the home position, they are far enough apart to allow a capsule 2 to be positioned between them. Advantageously, the capsule is positioned with its central axis substantially horizontal and parallel to or coinciding with the central axis of the extraction chamber 4. To keep a capsule 2 in the standby position, in which it is positioned between the first part 7 and the second part 8 when these are in the home position, the apparatus 1, in the known way, comprises retaining means for the capsule 2. Said retaining means are able to retain the capsule 2 in the standby position both when the first part 7 and the second part 8 are in the home position, and during at least part of their shifting from the home position to the extraction position (usually at least until the capsule 2 is inserted in the extraction chamber 4 enough so that it can no longer fall downwards).

The structure of the retaining means, not illustrated in the accompanying figures, may vary depending on requirements (such as those described in patents EP 1 721 553 B1 and EP 1 757 212 B1). For example, they may comprise two blocks slidably mounted on the first part 7 in such a way that they can move outwards. Each block is equipped with a vertical groove (closed at the bottom) facing the other block and in which, in use, the projecting upper flange of the capsule 2 is inserted. The blocks can also be spread apart after the shifting of the first part 7 and of the second part 8 towards the extraction position, to release the capsule 2 in the extraction chamber 4. However, since these are known solutions, they will not be described in further detail herein.

Advantageously, the apparatus 1 will also comprise capsule 2 expulsion means that cause the capsule 2 to be expelled from the extraction chamber 4 at the end of beverage supplying, as the first part 7 and the second part 8 return to the home position. The expulsion means may either be constituted of the retaining means, or they may be independent of the latter. Whatever the case, they are of the known type and, therefore, are not described in further detail herein.

In contrast, in the embodiments of FIGS. 17 to 20, the second part 8 forms a housing 22 for the capsule 2 and is movable relative to the rest of the apparatus 1 between an outer position, corresponding to the home position, and an inner position. When the second part 8 is in the outer position, the housing 22 is accessible from the outside of the apparatus and the capsule 2 can be inserted in the housing 22 and/or removed from it. In contrast, when the second part 8 is in the inner position, the capsule 2 can neither be inserted in the housing 22 nor removed from it.

Moreover, advantageously, the apparatus comprises a guiding element 23 designed to at least partly guide the shifting of the second part 8 between the inner position and the outer position.

Figure 17:
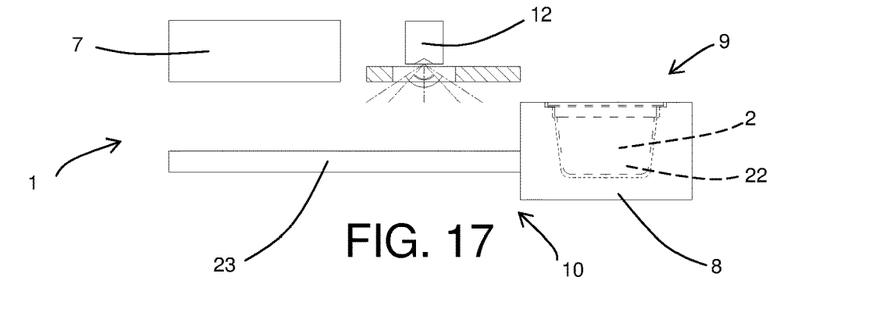
FIGS. 17, 18, and 19 are schematic side views with some parts in cross-section of a fourth embodiment of an apparatus for making beverages in accordance with this invention, in three different situations.
Figure 18:
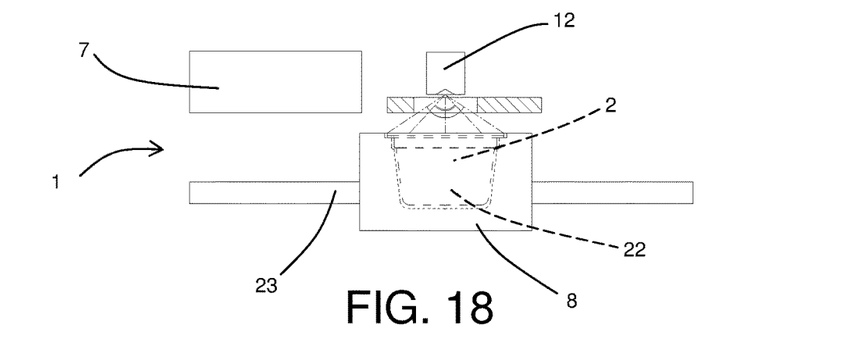
Figure 19:
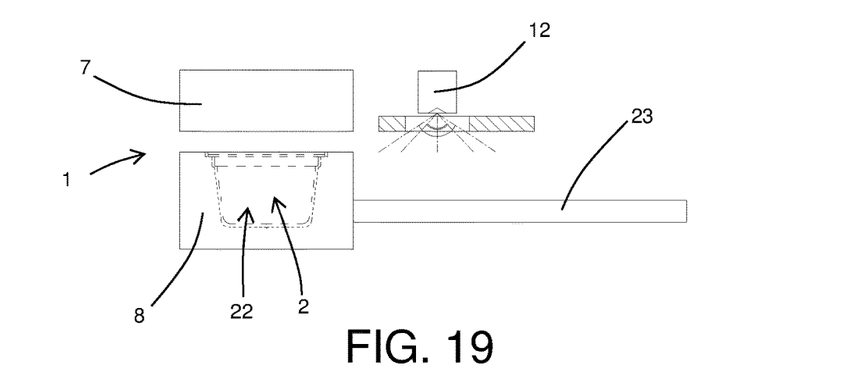
Figure 20:
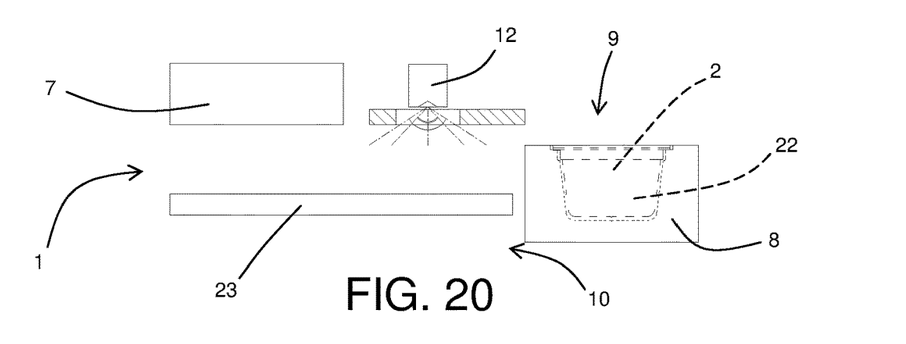
FIG. 20 is a schematic side view with some parts in cross-section of a fifth embodiment of an apparatus for making beverages in accordance with this invention.

In more detail, in the embodiment in FIGS. 17 to 19 the second part 8 remains slidably coupled to the guiding element 23 for the entirety of its shifting between the inner position and the outer position, whilst in the embodiment of FIG. 20 the second part 8 remains slidably coupled to the guiding element 23 only for part of its shifting between the inner position and the outer position. In fact, in this latter embodiment, at a certain point of its shifting towards the outer position, the second part can disengage from the guiding element 23 so that the outer position corresponds to any position in which it is completely separate from the rest of the apparatus 1.

In other embodiments, not illustrated, it is also possible that the apparatus may also comprise a supporting body for in use transferring a capsule 2 towards the extraction chamber 4; that supporting body will be movable between a pick-up position in which it can be loaded with a capsule and a releasing position in which it can release the capsule 2 in the extraction chamber. Therefore, in this case too, after being fed to the apparatus 1, a capsule 2 moves inside the apparatus 1 in a guided way.

In yet other embodiments, it is also possible that the second part 8 forms a housing 22 for the capsule 2 and that, when the second part 8 is in the home position, the capsule 2 may be inserted in the housing 22 by means of its own movement inside the apparatus 1 (advantageously by sliding and falling due to gravity).

There is also an infeed section 9 made in the apparatus 1, at which, in use, a capsule 2 can be fed to the apparatus 1. For example, in the embodiments of FIGS. 1 to 7 the infeed section 9 may be formed by an opening made in an outer case of the apparatus 1 or by a tubular guiding element such as that illustrated. In the embodiment of FIGS. 17 to 19, the infeed section 9 corresponds to the housing 22 made in the second part 8 when the latter is positioned in the outer position. Finally, in the embodiment of FIG. 20, the infeed section 9 corresponds to the housing 22 made in the second part 8 when the latter is positioned in the position in which it can be coupled to the guiding element 23 or removed from it.

A capsule 2 feed path 10 extends starting from the infeed section 9. Along this feed path, in use, the capsule 2 moves towards the extraction chamber 4.

In the embodiments of FIGS. 1 to 7, the feed path 10 extends to the retaining means, and, advantageously, comprises at least one vertical component so as to allow the capsule 2 to pass from the infeed section 9 to the retaining means simply by sliding due to gravity. Although in the accompanying figures that is achieved by means of a vertical feed path 10 with the infeed section 9 vertically over the retaining means and the open extraction chamber 4, in other embodiments the infeed section 9 may also advantageously be vertically out of alignment relative to the retaining means. In this case, the apparatus 1 may also advantageously comprise a steam discharge hole vertically aligned above the retaining means, through which to release, in use, any residual steam present in the extraction chamber 4 at the moment when it is opened.

In contrast, in the embodiments of FIGS. 17 to 20, the feed path 10 corresponds to at least part of a movement path of the second part 8 between the inner position and the outer position and in use the movement of the capsule along the feed path 10 occurs following the movement of the second part 8 along its own movement path. In particular, in the embodiment of FIGS. 17 to 19, the feed path 10 coincides with the movement path of the second part 8, whilst in the case of the embodiment of FIG. 20 the feed path 10 only corresponds to the part of the movement path of the second part 8 that is guided by the guiding element 23. In fact, in the latter case, the second part 8 may be coupled to and uncoupled from the rest of the apparatus 1 at the infeed section 9.

In the above-mentioned embodiments in which the apparatus 1 comprises a movable supporting body, the latter moves along the feed path 10.

In contrast, in the case of the above-mentioned apparatuses in which, when the second part 8 is in the home position, the capsule 2 may be inserted in the housing 22 of the second part 8 by means of its own movement inside the apparatus along the feed path 10, the housing 22 delimits the feed path 10.

In the embodiments of FIGS. 1 to 7, a closing element 11 is located along the feed path 10 and is movable between a closed position, in which it prevents capsule 2 feeding, and a disengaged position, in which it allows the passage of a capsule 2. The closing element 11 is operatively connected to the extraction unit 3 in such a way that the movements of the closing element 11 are coordinated with those of the first part 7 and the second part 8. In that way, the closing element 11 is positioned in the closed position when the first part 7 and the second part 8 are in the extraction position, and in the disengaged position when the first 7 and the second part 8 are in the home position.

In the embodiments illustrated in FIGS. 1 to 7, in which only the second part 8 is movable, the closing element 11 is substantially constituted of a rigid element that forms a kind of partition and that is connected to the second part 8 so that it moves in a way synchronised with it.

The means for making the beverage, the extraction unit 3, the closing element 11, the retaining means and the expulsion means adoptable in the embodiments illustrated in FIGS. 1 to 7 may, for example, correspond to what is described in patent applications WO 2015/019248 A1 and WO 2015/019249 A1 by this Applicant, to which reference should be made for further details and whose content is incorporated herein by reference to it.

According to a first innovative aspect of this invention, the apparatus 1 also comprises at least one image acquisition device 12 positioned along the feed path 10 outside the extraction chamber 4, for acquiring one or more images of the capsule 2 at least when the capsule is at an image capture zone 13 located along the feed path 10. In more detail, the image acquisition device 12 is designed, when the capsule 2 in use is positioned in the image capture zone 13, to capture images of at least an identification portion 14 of the capsule 2. In the context of this invention, the identification portion 14 is a portion on which a graphical element 15 is present, which is visible and recognisable to the naked eye. Moreover, advantageously, that graphical element 15 is constituted of a word mark or a figurative mark, preferably registered, designed to indicate to the consumer that the capsule 2 in question is compatible with the apparatus 1 and is approved by the manufacturer of the apparatus 1. In order to detect an image showing the graphical element 15, the image acquisition device 12 operates at least in the range of visible light.

Moreover, in the preferred embodiments, the identification portion 14 is advantageously constituted of a central part of the lid 6 of the capsule 2, so that it can always be detected by the image acquisition device 12 irrespective of the orientation of the capsule 2 relative to its own central axis. Consequently, the capsule 2 may be fed in the apparatus 1 without the need to take care with its orientation, as described in more detail below.

In the preferred embodiments, the image acquisition device 12 comprises at least one optical sensor, advantageously of the CIS (Contact Image Sensor) type. But there may even be sensors of other types, such as CCD (Charge-Coupled Device) sensors or other sensors using CMOS technology.

Preferably, in addition to an optical sensor facing the image capture zone 13, the image acquisition device 12 also comprises at least one lighting element (not illustrated) facing towards the image capture zone 13 for in use suitably lighting the identification portion 14 and allowing the acquisition of a first image with repeatable characteristics. Advantageously, the lighting element may be constituted of one or more LEDs.

Even to allow optimum operation of the image acquisition device 12, the apparatus 1 advantageously also comprises at least one guide for in use guiding the feeding of the capsule 2 along the feed path 10. At the image capture zone 13, the guide is preferably shaped in such a way as to hold the lid 6 of the capsule 2 oriented towards the image acquisition device 12, advantageously substantially perpendicular relative to an optical axis of the image acquisition device 12. In the preferred embodiment, the guide is constituted of a pair of channels 16 facing one another (if necessary they are aligned with those present in the retaining means) in which the flange 17 of the capsule 2 slides in a guided way.

Figure 1:
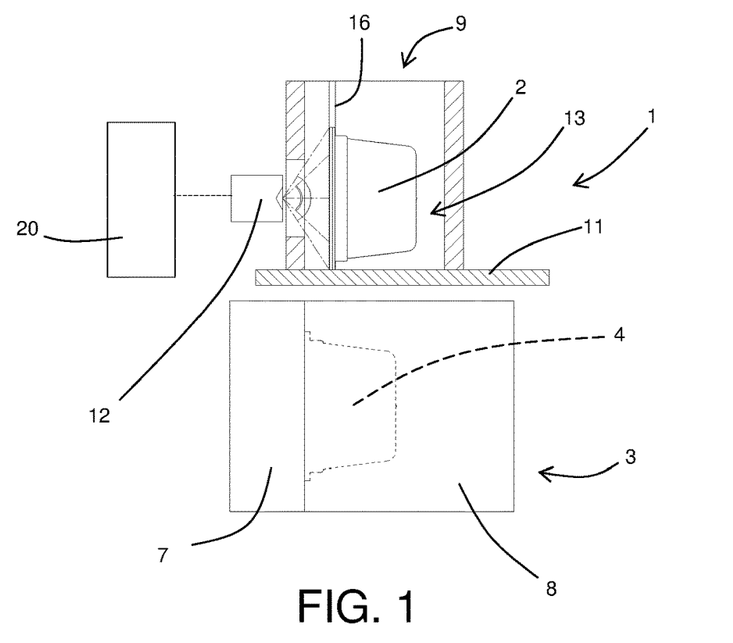
FIG. 1 is a schematic side view with some parts in cross-section of a first embodiment of an apparatus for making beverages using capsules containing a food substance, in accordance with this invention
Figure 2:
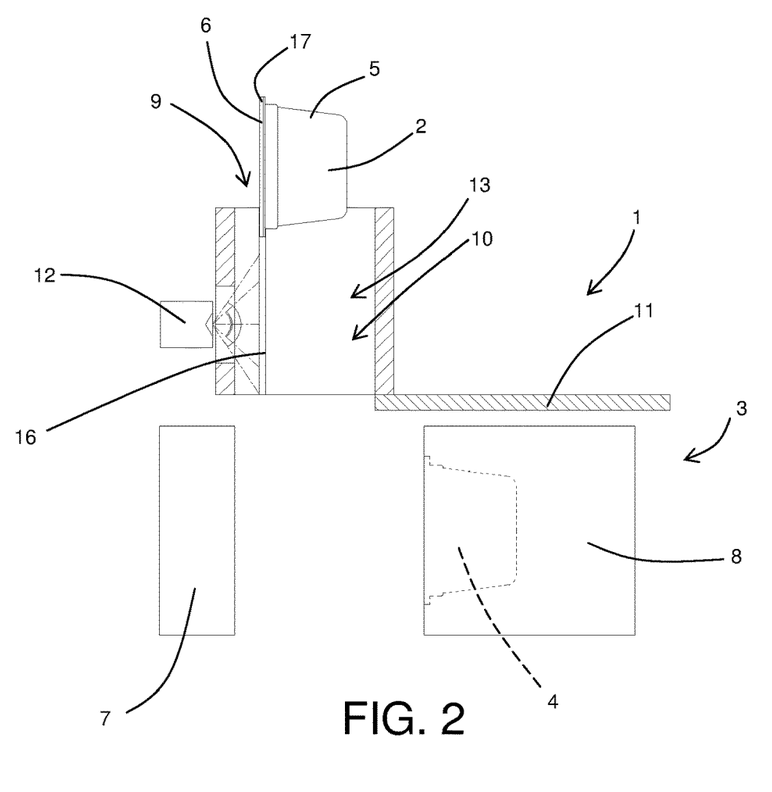
FIGS. 2, 3, 4, and 5 are schematic side views with some parts in cross-section of a second embodiment of an apparatus for making beverages in accordance with this invention, with the capsule positioned respectively in four different positions along the feed path.
Figure 3:
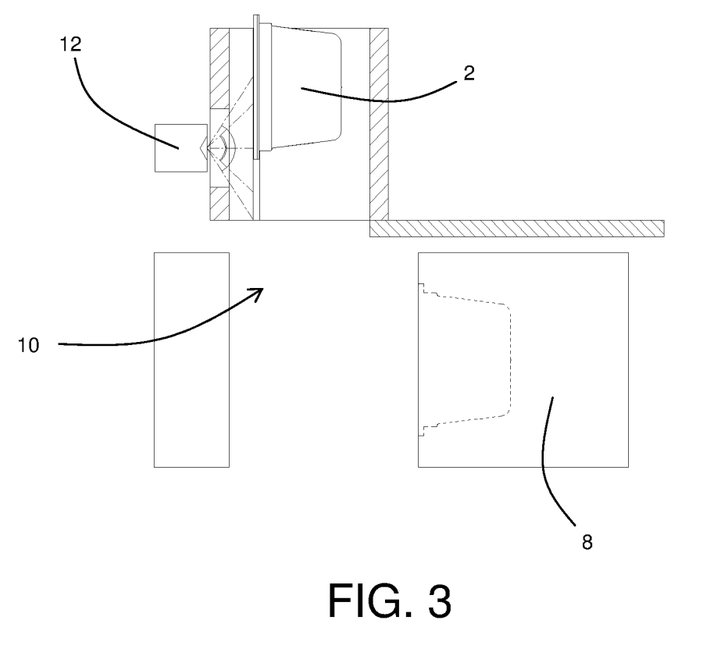
Figure 4:
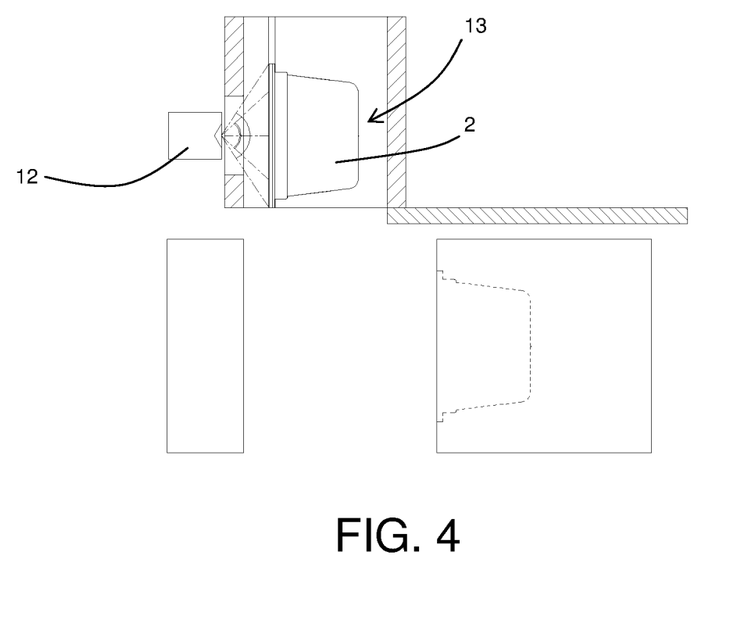
Figure 5:
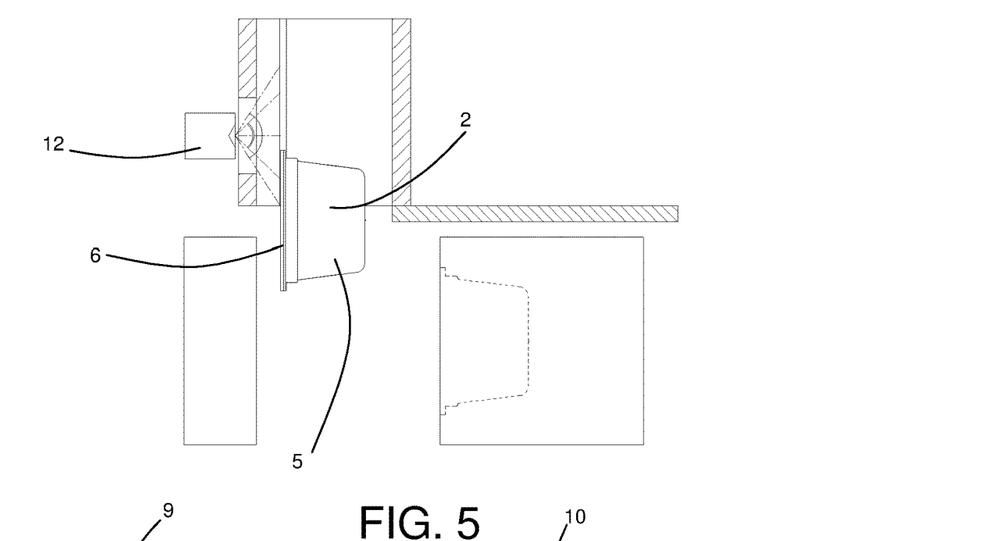

Moreover, preferably, the image acquisition device 12 has an angle of view such that it covers, at a plane that in use corresponds to an outer surface of the lid 6 of the capsule 2, an area comprising either the entire lid 6 or at least the entire identification portion 14. This latter case is schematically illustrated in the accompanying FIGS. 13 to 16, in which the circle 18 drawn with a dashed line indicates the angle of view defined by the lens of the image acquisition device 12, the square 19 drawn with a dot-dashed line indicates the angle of view defined by the sensor of the self-same device 12 (and, therefore, the actual area to which the image refers) and in which the identification portion 14 corresponds to a central area of the lid 6. Depending on the embodiments, the image capture zone 13 may be positioned, with reference to capsule 2 feeding along the feed path 10, either upstream (FIGS. 1 to 5) or downstream (FIGS. 6 and 7) of the closing element 11. In contrast, the image capture zone 13 is always located upstream of the retaining means. Moreover, in some embodiments, the image capture zone 13 may advantageously be delimited downstream by the closing element 11 in such a way that when the closing element 11 is in the closed position, a capsule 2 resting on it is in the image capture zone 13 (FIG. 1).

The apparatus 1 also comprises an electronic processing unit 20 (only illustrated with reference to the apparatus of FIG. 1) that is connected to the image acquisition device 12 for receiving the images detected by it and which is programmed to selectively enable or not enable the making of a beverage.

Depending on requirements, the electronic processing unit 20 may either be constituted directly of a control unit of the apparatus 1 that is set up to control its entire operation (from the beverage making means, to any movement of the extraction unit 3, etc.), or it may be an entity independent of the apparatus and connected to it in order to communicate consent or refusal for the making of the beverage.

In particular, the electronic processing unit 20 is programmed to perform the following operating steps:
- electronically comparing a first image detected by the image acquisition device 12, in which the identification portion 14 of the capsule 2 and the related graphical element 15 are visible, with one or more reference images saved in the apparatus 1 that also show the graphical element 15;
- verifying if there is a match between the graphical element 15 visible in the first image and that visible in at least one of the saved reference images; and
- enabling making of the beverage if and only if that match is verified.

The comparison and verification steps may be carried out using any image processing/recognition method. However, advantageously, the first image may be detected by the image acquisition device 12 in RAW format. In this case, the electronic processing unit 20 may be programmed to process the first image and reduce it to local descriptions before proceeding with the comparison step. In this way, it is possible to reduce the data to be processed relative to the first image, to a "fingerprint" constituted of a set of vectors. In the same way, corresponding "fingerprints" will also be saved for the saved images. During the subsequent comparison step what is performed is a search, in the database of known vectors that form the "fingerprints" of the saved images, for vectors that correspond to those of the "fingerprint" of the first image. In a way that is known in image comparison techniques, a score will be assigned to each comparison, definable as a matching score. It will be possible to assess the presence or absence of a match based on the overall matching score of each comparison (which depends on the matching scores of the individual vectors compared). In fact, it will be possible to establish that a match has been found when that matching score exceeds a preset threshold value. The choice of the threshold value to be used lies with the expert in the field and depends on many factors, including the resolution of the images, the number of colours, etc. In more detail, in the preferred embodiments, the matching score is determined by calculating a normalised cross-correlation coefficient.

As regards the step during which the electronic processing unit 20 processes the first image to reduce it to local descriptions, according to one possible method, it may involve a set of sub-steps carried out by the electronic processing unit 20 on the first image, including: demosaicing, thresholding and assessment of proximal lines. Those sub-steps provide preliminary filtering of the first image and guarantee intermediate output with constant performance for the subsequent comparison and verification steps.

Figures 8, 9, 10:
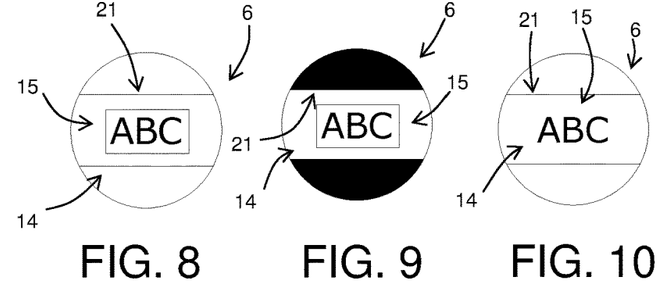
FIGS. 8, 9, 10, and 11 show four examples of capsule lids usable as identification portions of the respective capsules in the context of this invention.
Figure 11:
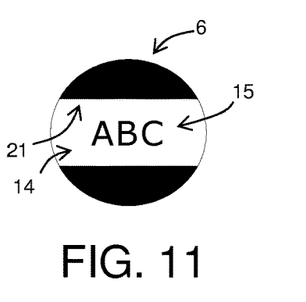
Figures 12, 13, 14:
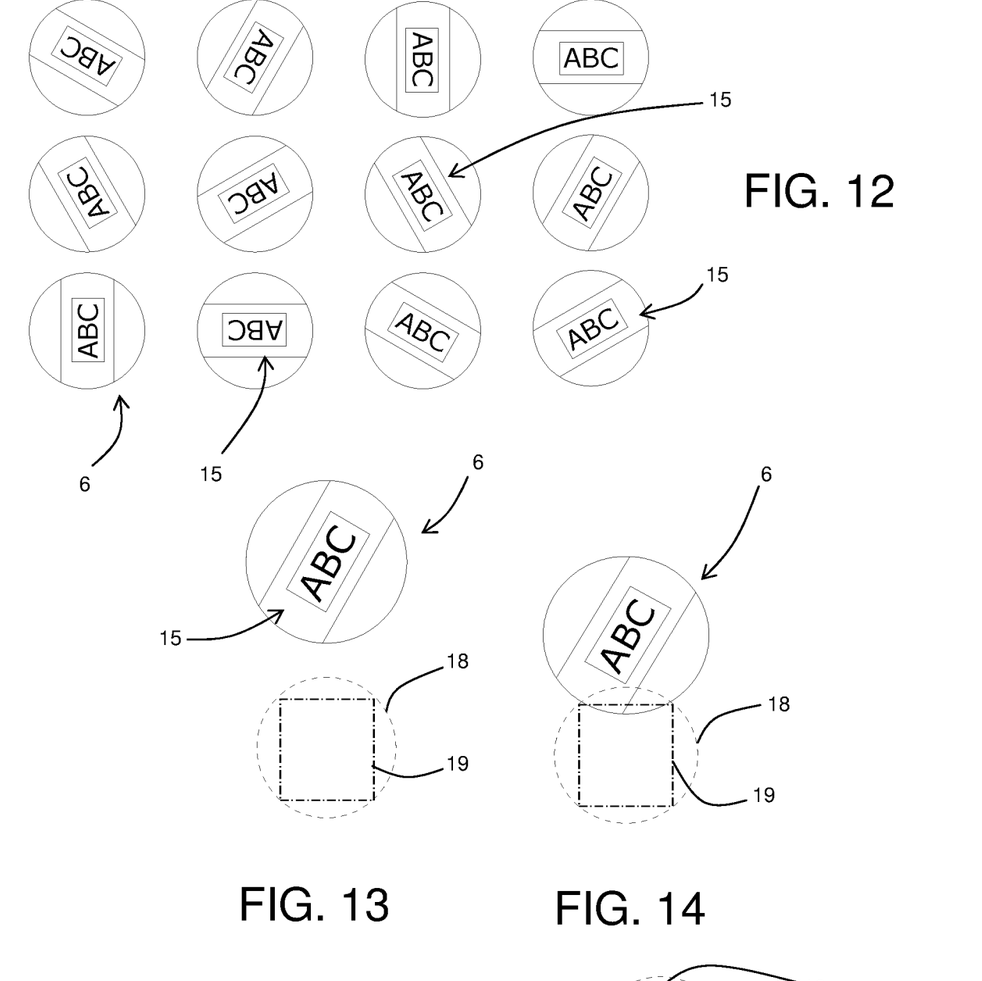
FIG. 12 shows a plurality of possible angular orientations that the same capsule may adopt at an image capture zone of the apparatus, illustrated with reference to the capsule of FIG. 8.
FIGS. 13, 14, 15, to 16 are schematic views perpendicular to the capsule lid, of the position relative to one another of a capsule identification portion and of an imagine acquirable with an image acquisition device that is part of the apparatus of FIG. 2, respectively with the capsule in the positions shown in FIGS. 2 to 5.
Figure 15:
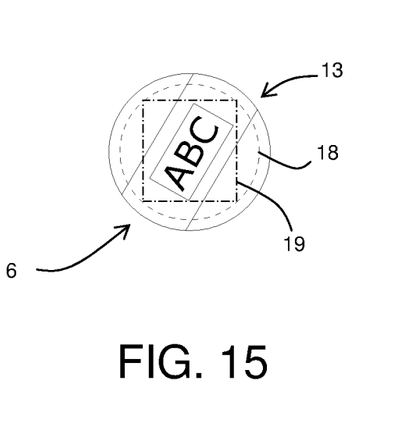
Figure 16:
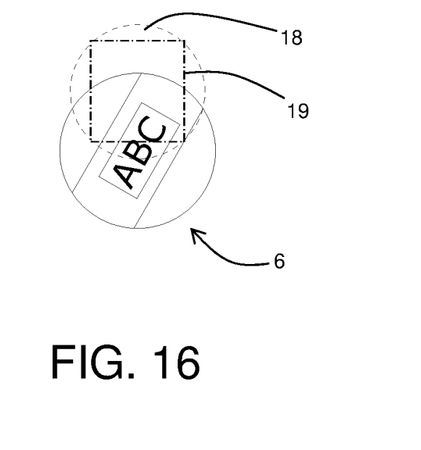

At least in the embodiments such as those illustrated in the accompanying figures, in which the capsule 2 is not oriented relative to its own central axis, during development of the algorithm run by the electronic processing unit 20 it is also necessary to take into account the fact that a single capsule 2 (such as that whose lid 6 is shown in FIG. 8) may arrive at the image capture zone 13 with—theoretically—infinite different orientations (some of which are illustrated in FIG. 12). In order to take that into account, the comparison step may be performed either by comparing the first image with a single saved image, but during the comparison step also assessing a possible mutual rotation of the graphical elements, or by comparing the first image saved with a plurality of saved images that differ from one another exclusively in terms of the angular orientation of the respective graphical element 15. However, in the latter case, obviously, the saved images would have to cover with sufficient angular resolution all 360° of rotation with a potential considerable increase in processing times and/or costs. To reduce the number of comparisons to be performed and to increase the precision of the check, advantageously, the graphical element 15 or in any case the identification portion 14 may comprise easily identifiable reference elements 21 that can be used to identify the orientation of the first image relative to a known reference (at least at less than 180°). In the preferred embodiment that is done by creating clear colour changes (for example from white to black) in the identification portion 14 along lines parallel to a reference direction, as shown by way of example in FIGS. 8 to 11. Moreover, before the actual comparison step, the electronic processing unit 20 performs the following further sub-steps: identification of the reference elements 21 in the first image, identification of the related orientation relative to the reference direction and (counter) rotation of the image by the angle determined in that way. Furthermore, the saved images cover with a relatively high angular resolution, exclusively a neighbourhood of the angles 0° and 180° (relative to the reference direction). For example, with a resolution of 0°30' in a neighbourhood of ±5° relative to the angle 0° and to the angle 180°, the maximum number of comparisons to be performed is forty-two. Alternatively, it is possible to keep saved images only in a neighbourhood of 0° and, if no match is found, to make the first image perform a further rotation through 180°, and to repeat the comparisons based on the image rotated in that way.

Obviously, if, in contrast, the apparatus 1 is such that it guarantees a constant orientation of the graphical element 15, the first image may always be compared with a single saved image.

What is described above relates to the processing of a first image that shows the capsule 2 positioned in the image capture zone 13 and, therefore, may have different applications depending whether the apparatus 1 is made in such a way that it always guarantees capsule 2 stopping in the image capture zone 13 at least until the first image has been acquired, or until beverage supplying has been enabled for the capsule 2 (see, for example, the apparatus 1 of FIG. 1), or whether the apparatus 1 is in contrast made in such a way that the capsule 2 exclusively moves through the image capture zone 13 (as in the apparatuses of FIGS. 2 to 7).

Whilst the former is very simple to manage, the latter requires further devices.

In particular, the apparatus 1 must guarantee acquisition of the first image every time a capsule 2 is fed to the extraction unit 3. That can be achieved in many ways. For example, first the image acquisition device 12 may always and continuously acquire images of the image capture zone 13 and ascertain the presence or absence of the capsule 2 based on an examination of those images. The frequency of acquisition of those images will have to such that it guarantees, considering the capsule 2 transit speed, the acquisition of at least one first image (that is to say, an image that shows the identification portion 14 and the entire graphical element 15). Alternatively, the image capture zone 13 may be positioned in such a way that a capsule 2 can pass through it only when the extraction chamber 4 is open, and the image acquisition device 12 continuously acquire images of the image capture zone 13 only when the extraction chamber 4 is open. In addition, there may be capsule 2 presence detection means at the feed path (not illustrated but comprising, for example, a photocell or a mechanical switch) and the image acquisition device 12 may continuously acquire images of the image capture zone 13 only from the moment when the detection means detect the presence of the capsule 2.

Depending on requirements, the image acquisition device 12 may or may not continuously acquire images of the image capture zone 13 after the capsule 2 has passed beyond the image capture zone 13.

The electronic processing unit 20 may, therefore, in general, also be programmed to examine one after another a plurality of images detected one after another by the image acquisition device 12, for identifying amongst them the first image to be compared with the saved images. That process is schematically illustrated in FIGS. 13 to 16, which overall show an identification portion 14 of a capsule 2 that passes through the image capture zone 13. The first image is that acquirable in the condition in FIG. 15.

Also in general, the electronic processing unit 20 may be operatively connected to the image acquisition device 12 for controlling its operation and causing the acquisition of images at least when, in use, a capsule 2 is positioned in or passes at the image capture zone 13.

Moreover, at least in the motor-driven units, when the image capture zone 13 is delimited downstream by the closing element 11, as in FIG. 1, the electronic processing unit 20 is advantageously programmed to enable shifting of the first part 7 and the second part 8 from the extraction position to the home position if and only if there has been preliminary acquisition of a first image of the capsule 2 located in the image capture zone 13, for which a match with one of the saved images has been identified.

In some preferred embodiments, the image acquisition device 12 continues acquiring images even after acquisition of a first image for which supplying of the beverage has been enabled, and the electronic processing unit 20 is programmed to examine those additional images in order to ascertain whether, after acquisition of the first image, the movement of the capsule 2 continued towards the retaining means or if it has been inverted and, in the latter case, to inhibit supplying of the beverage. This prevents a consent given for a first capsule 2 from being able to be unintentionally assigned to a second capsule 2 that has been inserted in the apparatus 1 after removal of the first capsule 2 (for example, after the user changed his or her mind about the type of beverage to be made).

Finally, in other embodiments, not illustrated, the first image detected by the image acquisition device 12 is also used for providing the apparatus with information about beverage supplying methods. This result can be achieved by using a different graphical element 15 depending on the type of capsule, and ensuring that saved in the database of saved images there are images of all of the possible graphical elements. Operation of the apparatus 1 according to this invention corresponds to that of prior art apparatuses, except for the fact that supplying of the beverage requires prior enabling from the electronic processing unit 20 based on what is indicated above.

Therefore, in general, this invention also covers a method for enabling the supplying of a beverage in an apparatus 1 for making beverages that uses capsules 2 containing a food substance, of the type described above, comprising the following operating steps:

when a capsule 2 is in the image capture zone 13, using the image acquisition device 12 to detect a first image, in which the identification portion 14 of the capsule 2 and the related graphical element 15 are visible;

electronically comparing the first image with one or more reference images saved in the apparatus 1;

verifying if there is a match between the graphical element 15 visible in the first image and that visible in at least one of the saved reference images; and enabling making of the beverage if and only if said match is verified.

In particular, in accordance with this invention, the graphical element 15 is constituted of a trademark (which may be of the figurative or word type).

Finally, it should be noticed that this invention may advantageously be applied both during the production of new apparatuses, and to modify existing apparatuses.

This invention brings important advantages.

In fact, this invention has allowed the development of a simple, inexpensive and reliable control system, which allows operation of an apparatus for making a beverages to be controlled in such a way that the beverage can only be supplied if a capsule that is suitable for the apparatus and approved by the manufacturer of the apparatus is used.

In particular, the solution involving recognition of a trademark located on the capsule lid using an image acquisition device located along the capsule feed path but outside of the extraction chamber, makes the recognition operation extremely reliable and repeatable over time, since it is not subject to deterioration following use of the apparatus.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for making beverages using capsules (2) containing a food substance, comprising:

an extraction unit (3) in which an extraction chamber (4) is made in which, in use, a capsule (2) can be inserted, the extraction unit (3) in turn comprising a first part (7) and a second part (8), which are movable, at least one relative to the other, between a home position in which they are at a distance from one another and in which the extraction chamber (4) is open to allow the insertion of a capsule (2) in it, and an extraction position in which they are coupled together and close the extraction chamber (4);

an infeed section (9) where, in use, a capsule (2) can be fed to the apparatus (1), a feed path (10) for the capsule (2) in the apparatus (1) extending from the infeed section (9);

means for making a beverage for, in use, making water circulate through a capsule (2) contained in the closed extraction chamber (4), thereby causing the beverage to be formed, and for supplying the beverage to the outside of the apparatus (1);

at least one image acquisition device (12) positioned along the feed path (10) outside the extraction chamber (4), and designed, in use, when the capsule (2) is positioned in an image capture zone (13) located along the feed path (10), to capture images of at least an identification portion (14) of the capsule (2) on which a graphical element (15) is present and visible; the image acquisition device (12) operating at least in the range of visible light;

an electronic processing unit (20) connected to the image acquisition device (12) for receiving the images detected by it;

wherein the electronic processing unit (20) is programmed to selectively enable or not enable the making of a beverage by performing the following operating steps:

electronically comparing a first image detected by the image acquisition device (12), in which the identification portion (14) of the capsule (2) and the related graphical element (15) are visible, with one or more reference images saved in the apparatus (1);

verifying if there is a match between the graphical element (15) visible in the first image and that visible in at least one of the saved reference images; and enabling making of the beverage if and only if said match is verified, wherein the image acquisition device (12) continues acquiring images even after the acquisition of a first image for which supplying of the beverage has been enabled, and wherein the electronic processing unit (20) is also programmed to examine said further images to determine if, after the acquisition of the first image for which said match has been found, the movement of the capsule (2) has continued towards a retaining means or if it has been inverted, and to inhibit supplying of the beverage if the movement has been inverted.

2. The apparatus according to claim 1, wherein the electronic processing unit (20) is also programmed to examine one after another a plurality of images detected one after another by the image acquisition device (12) for identifying amongst them the first image to be compared with the saved images.

3. The apparatus according to claim 1, wherein the electronic processing unit (20) is operatively connected to the image acquisition device (12) for controlling its operation and causing the acquisition of images at least when, in use, a capsule (2) is positioned in or passes at the image capture zone (13).

4. The apparatus according to claim 1, also comprising means for detecting the presence of a capsule (2) at the feed path which are connected to the electronic processing unit, and wherein the electronic processing unit (20) controls the image acquisition device (12) in such a way as to cause the acquisition of images at least from when the detection means detect the presence of the capsule (2) until the capsule (2) has gone beyond the image capture zone (13).

5. The apparatus according to claim 1, wherein the electronic processing unit (20) is also programmed to perform, before the step of electronically comparing the first image with one or more reference images saved in the apparatus (1), an operating step of determining the angular orientation of the first image relative to a reference orientation.

6. The apparatus according to claim 1, wherein the image acquisition device (12) comprises at least one optical sensor facing the image capture zone (13) and at least one lighting element facing towards the image capture zone (13) for in use lighting the identification portion (14).

7. The apparatus according to claim 1, wherein the image acquisition device (12) comprises at least one CIS optical sensor.

8. The apparatus according to claim 1, also comprising at least one guide for in use guiding capsule (2) feeding along the feed path (10) and shaped, at the image capture zone (13), in such a way as to hold a lid (6) of the capsule (2) oriented towards the image acquisition device (12).

9. The apparatus according to claim 1, wherein the image acquisition device (12) has an angle of view such that it covers, at a plane that in use corresponds to an outer surface of the lid (6) of the capsule (2), an area comprising the entire identification portion (14), said identification portion (14) corresponding to a central area of the lid (6) or to the entire lid (6).

10. The apparatus according to claim 1, wherein the second part (8) forms a housing (22) for the capsule and is movable relative to the rest of the apparatus (1) between an outer position corresponding to the home position, in which the housing (22) is accessible from the outside of the apparatus and the capsule (2) can be inserted in the housing (22) and removed from it, and an inner position in which the capsule (2) cannot be inserted in the housing (22) or removed from it, the feed path (10) corresponding to at least part of a movement path of the second part (8) between the inner position and the outer position and in use the movement of the capsule along the feed path (10) occurring following the movement of the second part (8) along the movement path.

11. The apparatus according to claim 10, wherein when the second part (8) is in the outer position it is separate from the rest of the apparatus (1), and wherein the second part can be coupled to and uncoupled from the rest of the apparatus (1) at said infeed section (9).

12. The apparatus according to claim 1, wherein the apparatus also comprises a supporting body movable along the feed path for in use transferring a capsule (2) from the infeed section (9) towards the extraction chamber.

13. The apparatus according to claim 1, wherein the second part (8) forms a housing (22) for the capsule (2) and wherein, when the second part (8) is in the home position the housing (22) delimits the feed path (10) and the capsule (2) can be inserted in the housing (22) by means of a movement along the feed path (10).

14. The apparatus according to claim 1, also comprising retaining means for retaining the capsule (2) between the first part (7) and the second part (8), when these parts are in the home position, the feed path extending as far as the retaining means.

15. The apparatus according to claim 14, wherein the image capture zone (13) is located upstream of the retaining means with reference to capsule (2) feeding along the feed path (10).

16. The apparatus according to claim 13, also comprising a closing element (11) located along the feed path (10) and movable between a closed position in which it prevents capsule (2) feeding and a disengaged position in which it allows the passage of a capsule (2), the closing element (11) being operatively connected to the extraction unit (3) so that it is positioned in the closed position when the first part (7) and the second part (8) are in the extraction position, and in the disengaged position when the first part (7) and the second part (8) are in the home position.

17. The apparatus according to claim 16, wherein the image capture zone (13) is located upstream of the closing element (11) with reference to capsule (2) feeding along the feed path (10).

18. The apparatus according to claim 17, wherein said image capture zone (13) is delimited downstream by the closing element (11) in such a way that when the closing element (11) is in the closed position a capsule (2) resting on it is in the image capture zone (13).

19. The apparatus according to claim 18, wherein the electronic processing unit (20) is programmed to enable the shifting of the first part (7) and of the second part (8) from the extraction position to the home position if and only if it discovers said match with reference to a first image of a capsule (2) located in the image capture zone (13).

20. The apparatus according to claim 16, wherein the image capture zone (13) is located downstream of the closing element (11) with reference to capsule (2) feeding along the feed path (10).

21. An apparatus for making beverages using capsules (2) containing a food substance, comprising:
   an extraction unit (3) in which an extraction chamber (4) is made in which, in use, a capsule (2) can be inserted, the extraction unit (3) in turn comprising a first part (7) and a second part (8), which are movable, at least one relative to the other, between a home position in which they are at a distance from one another and in which the extraction chamber (4) is open to allow the insertion of a capsule (2) in it, and an extraction position in which they are coupled together and close the extraction chamber (4);
   an infeed section (9) where, in use, a capsule (2) can be fed to the apparatus (1), a feed path (10) for the capsule (2) in the apparatus (1) extending from the infeed section (9);
   means for making a beverage for, in use, making water circulate through a capsule (2) contained in the closed extraction chamber (4), thereby causing the beverage to be formed, and for supplying the beverage to the outside of the apparatus (1);
   at least one image acquisition device (12) positioned along the feed path (10) outside the extraction chamber (4), and designed, in use, when the capsule (2) is positioned in an image capture zone (13) located along the feed path (10), to capture images of at least an identification portion (14) of the capsule (2) on which a graphical element (15) is present and visible; the image acquisition device (12) operating at least in the range of visible light;
   an electronic processing unit (20) connected to the image acquisition device (12) for receiving the images detected by it;
wherein the electronic processing unit (20) is programmed to selectively enable or not enable the making of a beverage by performing the following operating steps:
   electronically comparing a first image detected by the image acquisition device (12), in which the identification portion (14) of the capsule (2) and the related graphical element (15) are visible, with one or more reference images saved in the apparatus (1);
   verifying if there is a match between the graphical element (15) visible in the first image and that visible in at least one of the saved reference images; and
   enabling making of the beverage if and only if said match is verified,
wherein the electronic processing unit (20) is also programmed to perform, before the step of electronically comparing the first image with one or more reference images saved in the apparatus (1), an operating step of determining the angular orientation of the first image relative to a reference orientation.

22. An apparatus for making beverages using capsules (2) containing a food substance, comprising:
   an extraction unit (3) in which an extraction chamber (4) is made in which, in use, a capsule (2) can be inserted, the extraction unit (3) in turn comprising a first part (7) and a second part (8), which are movable, at least one relative to the other, between a home position in which they are at a distance from one another and in which the extraction chamber (4) is open to allow the insertion of a capsule (2) in it, and an extraction position in which they are coupled together and close the extraction chamber (4);

an infeed section (9) where, in use, a capsule (2) can be fed to the apparatus (1), a feed path (10) for the capsule (2) in the apparatus (1) extending from the infeed section (9);

means for making a beverage for, in use, making water circulate through a capsule (2) contained in the closed extraction chamber (4), thereby causing the beverage to be formed, and for supplying the beverage to the outside of the apparatus (1);

at least one image acquisition device (12) positioned along the feed path (10) outside the extraction chamber (4), and designed, in use, when the capsule (2) is positioned in an image capture zone (13) located along the feed path (10), to capture images of at least an identification portion (14) of the capsule (2) on which a graphical element (15) is present and visible; the image acquisition device (12) operating at least in the range of visible light;

an electronic processing unit (20) connected to the image acquisition device (12) for receiving the images detected by it;

wherein the electronic processing unit (20) is programmed to selectively enable or not enable the making of a beverage by performing the following operating steps:

electronically comparing a first image detected by the image acquisition device (12), in which the identification portion (14) of the capsule (2) and the related graphical element (15) are visible, with one or more reference images saved in the apparatus (1);

verifying if there is a match between the graphical element (15) visible in the first image and that visible in at least one of the saved reference images; and enabling making of the beverage if and only if said match is verified, wherein the apparatus also comprises a supporting body movable along the feed path for in use transferring a capsule (2) from the infeed section (9) towards the extraction chamber.

23. An apparatus for making beverages using capsules (2) containing a food substance, comprising:

an extraction unit (3) in which an extraction chamber (4) is made in which, in use, a capsule (2) can be inserted, the extraction unit (3) in turn comprising a first part (7) and a second part (8), which are movable, at least one relative to the other, between a home position in which they are at a distance from one another and in which the extraction chamber (4) is open to allow the insertion of a capsule (2) in it, and an extraction position in which they are coupled together and close the extraction chamber (4);

an infeed section (9) where, in use, a capsule (2) can be fed to the apparatus (1), a feed path (10) for the capsule (2) in the apparatus (1) extending from the infeed section (9);

means for making a beverage for, in use, making water circulate through a capsule (2) contained in the closed extraction chamber (4), thereby causing the beverage to be formed, and for supplying the beverage to the outside of the apparatus (1);

at least one image acquisition device (12) positioned along the feed path (10) outside the extraction chamber (4), and designed, in use, when the capsule (2) is positioned in an image capture zone (13) located along the feed path (10), to capture images of at least an identification portion (14) of the capsule (2) on which a graphical element (15) is present and visible; the image acquisition device (12) operating at least in the range of visible light;

an electronic processing unit (20) connected to the image acquisition device (12) for receiving the images detected by it;

wherein the electronic processing unit (20) is programmed to selectively enable or not enable the making of a beverage by performing the following operating steps:

electronically comparing a first image detected by the image acquisition device (12), in which the identification portion (14) of the capsule (2) and the related graphical element (15) are visible, with one or more reference images saved in the apparatus (1);

verifying if there is a match between the graphical element (15) visible in the first image and that visible in at least one of the saved reference images; and enabling making of the beverage if and only if said match is verified, wherein the second part (8) forms a housing (22) for the capsule (2) and wherein, when the second part (8) is in the home position the housing (22) delimits the feed path (10) and the capsule (2) can be inserted in the housing (22) by means of a movement along the feed path (10), the apparatus also comprising a closing element (11) located along the feed path (10) and movable between a closed position in which it prevents capsule (2) feeding and a disengaged position in which it allows the passage of a capsule (2), the closing element (11) being operatively connected to the extraction unit (3) so that it is positioned in the closed position when the first part (7) and the second part (8) are in the extraction position, and in the disengaged position when the first part (7) and the second part (8) are in the home position, and wherein the image capture zone (13) is located upstream of the closing element (11) with reference to capsule (2) feeding along the feed path (10).

* * * * *